United States Patent Office 3,540,842
Patented Nov. 17, 1970

3,540,842
METHOD FOR THE SEPARATION OF NICKEL AND CADMIUM FROM A MIXTURE
John P. Tourish, Wallingford, Pa., assignor to Allied Chemical Corporation, New York, N.Y., a corporation of New York
No Drawing. Filed Aug. 21, 1968, Ser. No. 754,493
Int. Cl. C01g *11/00;* H01m *47/00*
U.S. Cl. 23—102                                         9 Claims

ABSTRACT OF THE DISCLOSURE

Nickel and cadmium values are separated from mixed nickel-cadmium containing materials through differences in reactivity of the thermally generated oxides with cold nitric acid.

BACKGROUND OF THE INVENTION

The present invention relates to a novel process for the separation of nickel and cadmium values from materials which contain these two elements. The present invention is also directed to the treatment of materials containing nickel and cadmium in admixture with other metal values, the adjunct hydroxides and oxides of these other values, illustrative examples being iron, chromium, cobalt, manganese, aluminum oxide, silicon dioxide, and sodium hydroxide.

One object of my invention is to separate nickel and cadmium from materials containing these values through differences in reactivity of their thermally generated oxides with cold nitric acid.

A more specific object of my invention is the separation of nickel and cadmium values from mixed nickel-cadmium containing wastes, generated during the manufacture of nickel-cadmium storgae cells, through differences in reactivity of the thermally generated oxides with nitric acid.

Other objects and advantages of my provess as compared with prior art will become more apparent upon examination of the following more detailed disclosure.

SUMMARY OF THE INVENTION

My invention comprises the steps of mixing the material containing thermally generated nickel and cadmium oxides with an aqueous solution of cold nitric acid to produce an aqueous solution of cadmium nitrate, obtaining the nickel value in the solid phase, and separating the cadmium nitrate solution from the residual material. The residual material may then be treated with boiling nitric acid to recover nickel as an aqueous solution of nickel nitrate.

More specifically, the process of my invention involves an initial reaction of a material containing mixed thermally generated nickel and cadmium oxides with an aqueous solution of cold nitric acid to leach out the cadmium value. As will be discussed hereinafter, the reaction is carried out at about from 3 to about 15° C., preferably in the range of 3 to 10° C. The material containing nickel and cadmium oxides is subjected to the aqueous solution of nitric acid for a period of time sufficient to dissolve substantially all of the cadmium as cadmium nitrate. If the treated material contains constituents of other elements which form soluble nitrates, these elements will also form nitrates which go into solution. A quantity of nitric acid is applied to material, which is sufficient to nitrate the cadmium, and other soluble nitrate forming constituents.

DESCRIPTION OF THE PREFERRED EMBODIMENTS

It is found that in the manufacture of nickel-cadmium storage cells, a waste sludge consisting of an alkaline slurry of cadmium hydroxide, nickel hydroxide, other extraneous metal hydroxides is obtained. The present invention provides a commercially practicable method of separation of nickel and cadmium values from sludges produced during manufacture of the cells for the separation of the nickel and cadmium values from discarded cells and for the separation of nickel and cadmium values from reject battery plates or "plaques" consisting of a nickel base impregnated with nickel and cadmium hydroxides.

In the method of this procedure, the alkaline sludge is washed to remove contaminating soluble alkaline wastes therein, such as sodium hydroxide, whereas the nickel and cadmium values as extant in the sludge are insoluble. The drained residual sludge is superficially heated, for example to about 110 to 140° C., until it is substantially dry. The residue so obtained is then calcined at between 600 and 1000° C., however, in particular the most satisfactory results are obtained when the ignition temperature is for example about 725 to 840° C. I have found that after ignition at about 750° C., nickel and cadmium oxides exhibit their maximum differential in reactivity with aqueous nitric acid solution. Ignition continues for several hours and preferably for at least about 16 hours. The calcined residue is digested in cold nitric acid, below ambient temperatures and preferably at about 3 to 10° C., for at least one hour and preferably about two hours. Upon filtering, cadmium nitrate is found to subsist in the filtrate, while the nickel value remains therein unattacked in the filter residue. The filter residue is digested in boiling nitric acid to dissolve the nickle value as nickel nitrate, with subsequent filtration of the resulting solution to remove the remaining insolubles.

In my process the various conditions may vary over considerable ranges and yet come within the scope of my invention. In dissolving the ignited residue, the concentration of nitric acid is not critical. The concentrations may vary from 10% to 70% although I prefer a concentration of not over 50%. The amount of acid used may vary considerably but I prefer to use somewhat in excess of the stoichiometric amount of acid which would be required to combine with the cadmium value, for example 10% in excess.

The following examples illustrate the invention in greater detail.

Example I

An alkaline sludge containing among its constituents cadmium hydroxide, nickel hydroxide and sodium hydroxide was mixed to achieve a uniform slurry therein, a 400 gm. sample was extracted and added to 440 cc. of water. Settling was facilitated by the addition to said slurry of 1 cc. of a 1% Separan solution (trademark for flocculating agents). After permitting the slurry to settle, the slurry was washed with water six times by decantation to remove soluble hydroxides. The settled slurry was drained and superficially dried at 110 to 120° C., wherein the dried cake was then calcined in a muffle furnace at about 730° C. for a period of about 16 hours. After powdering the residue, said residue was digested in 100 cc. of an aqueous solution of nitric acid of about 50% concentration at a temperature of about 10° C. for about 2 hours. The slurry was then filtered and the resulting slight green filtrate containing cadmium nitrate separated from the residue containing insoluble nickel value residue. The resulting residue was digested in 100 cc. of a boiling aqueous solution of nitric acid until substantially all the nickel dissolved as nickel nitrate. It was found, upon analyzing the resulting nitrate solutions, that 84.5% of the theoretical amount of cadmium was recovered and 54.6% of the theoretical amount of nickel was recovered. The theoretical recoveries were determined by the analyzing of a slurry residue sample immediately after calcination.

Example II

An alkaline sludge containing among its constituents cadmium hydroxide, nickel hydroxide and sodium hydroxide, was mixed to achieve a uniform slurry therein, a 400 gm. sample was treated and added to 400 cc. of water to facilitate settling 2 cc. of a 1% Separan solution (trademark for flocculating agents) was added. After allowing the slurry to settle, said slurry was washed six times by decantation with water to remove soluble alkaline hydroxides. The settled slurry was drained and subjected to superficial heating at about 120° C. The dried cake was then ignited in a muffle furnace at about 840° C. for a period of about 16 hours. After powdering the calcined residue, said residue was digested in 100 gms. of an aqueous solution of nitric acid of about 50% concentration at an operative temperature of about 10° C. for a period of about 2 hours. The slurry was then filtered and the resulting slight green filtrate containing cadmium nitrate was separated from the insoluble nickel value. The filter residue was subsequently digested in 100 cc. of a boiling aqueous solution of nitric acid of about 50% concentration for a period of time sufficient to permit substantially all of the nickel to dissolve. Upon analysis it was found that 86.5% of the theoretical amount of cadmium was recovered and it was further found that 10.3% of the theoretical amount of nickel was recovered. The theoretical values were determined by an analysis of the calcine residue for nickel and cadmium.

Example III

A 200 gm. sample of an alkaline sludge containing among its constituents cadimum hydroxide, nickel hydroxide, and sodium hydroxide was admixed with 200 cc. of distilled water in an open vessel. Settling was facilitated by the addition to said sludge of 2 cc. of a 1% Separan solution (trademark for fluocculating agents.) After permitting the sludge to settle, said sludge was washed seven times by decantation with water to remove soluble hydroxides contained therein. The settled sludge was drained of excess liquid and superficially dried at 130 to 140° C., wherein the dried cake was then calcined in a muffle furnace at about 750° C. for a period of about 22 hours. After powdering the residue, said residue was digested in 100 cc. of an aqueous solution of nitric acid of about 50% concentration at the operative temperature of about 10° C. for about 1½ hours. The sludge was then filtered and the resulting filtrate containing cadimum nitrate separated from the insoluble nickel value residue. The resulting residue was digested in 100 cc. of boiling nitric acid until substantially all the nickel dissolved as nickel nitrate. It was found, upon analyzing the resulting nitrate solutions, that 81% of the theoretical amount of cadmium was recovered and 90% of the theoretical amount of nickel was recovered. The theoretical recoveries were determined by analyzing the constituents of a sludge sample.

Example IV

A 200 gm. sample of an alkaline sludge containing among its constituents cadmium hydroxide, nickel hydroxide and sodium hydroxide was admixed with 200 cc. of distilled water in an open vessel. The settling was facilitated by the addition of to said sludge of 2 cc. of a 1% Separan solution (trademark for flocculating agents). After permitting the sludge to settle, said sludge was washed by decantation with water to remove soluble hydroxides contained therein. The settled sludge was drained of excess liquid and superficially dried at 130 to 140° C., wherein the dried cake was then calcined in a muffle furnace at about 750° C. for a period of about 22 hours. After powdering the residue, said residue was digested in an aqueous solution of nitric acid of about 50% concentration, the quantity of said acid being 10% in excess of the stoichiometric amount of nitric acid necessary to dissolve the cadmium value as cadmium nitrate, and the operative temperature of the ensuing reaction being maintained below 15° C. for a period of about 2 hours. The sludge was then filtered and the resulting filtrate containing cadmium nitrate separated from the insoluble nickel value residue. The resulting residue was digested in about 115 cc. of a boiling aqueous nitric acid solution for a period of about 45 minutes, after which time substantially all the nickel dissolved as nickel nitrate. It was found, upon analyzing the resulting nitrate solutions that 95% of the theoretical amount of cadmium was recovered and 94% of the theoretical amount of nickel was recovered. The theoretical recoveries were determined by analyzing the constituents of a sludge sample.

Example V

A 206 gm. sample of an alkaline sludge containing among its constituents cadmium hydroxide, nickel hydroxide and sodium hydroxide was admixed with 206 cc. of water in an open vessel. Settling was facilitated by the addition to said sludge of 2 cc. of a 1% Separan solution (trademark for flocculating agents). This mixture was agitated for several minutes and permitted to settle. After permitting said sludge to settle, the sludge was washed six times by decantation with water to remove soluble hydroxides contained therein. The settled sludge was drained of excess liquid and superficially dried at 100 to 110° C., wherein the dried cake was then calcined in a muffle furnace at about 1000° C. for a period of about 17 hours. After powdering the residue, said residue was digested in 100 cc. of an aqueous solution of nitric acid of about 50% concentration at the operative temperature of about 31° C. for about 2 hours. The sludge was then filtered and the resulting filtrate containing cadmium nitrate separated from the insoluble nickel value residue. The resulting residue was digested in 145 cc. of a boiling aqueous nitric acid solution until substantially all the nickel dissolved as nickel nitrate. It was found, upon analyzing the resulting nitrate solution, that 86% of the theoretical amount of cadmium was recovered and 80% of the theoretical amount of nickel was recoved. The theoretical recoveries were determined by analyzing the percentage of the constituents contained in a representative sludge sample.

While my process may be applied to diverse materials containing nickel and cadmium oxides, therein, the preferred application of said process is to the separation of nickel and cadmium values from mixed alkaline wastes, generated during the manufacture of nickel-cadmium storage cells.

While the present invention has been described in detail with respect to specific embodiments thereof, it is not intended that these embodiments circumscribe the invention except as it is limited by the claims.

I claim:

1. A process for treating cadmium and nickel oxide bearing materials, comprising calcining the material at a temperature above 600° C., mixing the calcined material with an aqueous solution of nitric acid not above 31° C. in an amount at least sufficient to combine with the major portion of the cadmium and also combine with other constituents of the material capable of being dissolved by nitric acid, maintaining the acid and material in contact for a sufficient period of time to dissolve the major portion of the cadmium from the material and separating the solution from the undissolved residual portion of the nickel containing material.

2. A process as recited in claim 1, wherein the undissolved residual portion of the nickel containing material is digested in a boiling aqueous solution of nitric acid and separated from any remaining insolubes.

3. A process as recited in claim 2, wherein the calcining continues for a period in excess of 16 hours.

4. A process as recited in claim 3, wherein the calcining takes place at temperatures from about 725 to about 840° C.

5. A process of treating cadmium and nickel containing materials, comprising the steps of drying said nickel and cadmium bearing material at about 110 to 140° C., calcining the dried material for a period in excess of 16 hours at a temperature of about 600 to 1000° C., mixing the calcined material with an aqueous solution of cold nitric acid at about 3 to 15° C. of from 10% to 70% concentration in an amount at least sufficient to combine with the major portion of the cadmium and also combine with other constituents of the material capable of being dissolved by nitric acid, maintaining the acid and material in contact for a sufficient period of time to dissolve the major portion of the cadmium the material and separating the solution from the undissolved residual portion of the nickel containing material.

6. A process of treating materials containing nickel and cadmium hydroxide, comprising the steps of drying said nickel and cadmium bearing material at about 110 to 140° C.; calcining the dried material for a period in excess of 16 hours at a temperature of about 700 to 850° C.; mixing the calcined material with an aqueous solution of about 50% nitric acid concentration, wherein the mixture is maintained in the temperature range of 3 to 10° C., the amount of acid added being at least sufficient to combine with the major portion of the cadmium and also combine with other constituents of the material capable of being dissolved by nitric acid; maintaining the acid and material in contact for a sufficient period of time to dissolve the major portion of the cadmium from the material and separating the solution from the undissolved residual portion of the nickel containing material.

7. A process of separating cadmium and nickel value from a mixed alkaline sludge, generated during the manufacture of nickel-cadmium storage cells, comprising the steps of drying said nickel and cadmium bearing material at about 110° to 140° C., calcining the dried material for a period in excess of 16 hours at a temperature of about 700 to 850° C., mixing the calcined material with an equeous solution of cold nitric acid of from 10% to 70% concentration at a temperature of 3 to 15° C. in an amount at least sufficient to combine with the major portion of the cadmium and also combine with other constituents of the material capable of being dissolved by nitric acid, maintaining the acid and material in contact for a sufficient period of time to dissolve the major portion of the cadmium from the material and separating the solution from the undissolved residual portion of the nickel containing material.

8. A process of separating cadmium and nickel values from a mixed alkaline sludge, generated during the manufacture of nickel-cadmium storage cells, comprising the steps of drying said nickel and cadmium bearing material at about 110 to 140° C.; calcining the dried material for a period of about 16 to 24 hours at a temperature of about 725 to 850° C.; mixing the calcined material with an aqueous solution of about 50% cold nitric acid, wherein the mixture is maintained in the temperature range of 3 to 10° C., the amount of acid added being at least sufficient to combine with the major portion of the cadmium and also combine with other constituents of the material capable of being dissolved by nitric acid; maintaining the acid and material in contact for a sufficient period of time to dissolve the major portion of the cadmium from the material and separating the solution from the undissolved residual portion of the nickel containing material.

9. A process as recited in claim 8, wherein the undissolved residual portion of the nickel containing material is digested in a boiling aqueous solution of nitric acid and filtered to remove any remaining insolubles.

References Cited
UNITED STATES PATENTS

| | | | |
|---|---|---|---|
| 2,676,096 | 4/1954 | Emert et al. | 75—71 |
| 3,248,212 | 4/1966 | Mellgren et al. | 75—101 |

OSCAR R. VERTIZ, Primary Examiner

G. O. PETERS, Assistant Examiner

U.S. Cl. X.R.

75—101; 136—65

PO-1050
(5/69)

UNITED STATES PATENT OFFICE
CERTIFICATE OF CORRECTION

Patent No. 3,540,842  Dated November 17, 1970

Inventor(s) John P. Tourish

It is certified that error appears in the above-identified patent and that said Letters Patent are hereby corrected as shown below:

Column 2, line 53, "440 cc" should read "400 cc";
Column 4, line 43, "recoved" should read "recovered; line 73, "insolubes" should read "insolubles";
Column 5,
    line 42, "equeous" should read "aqueous".

SIGNED AND
SEALED
MAR 9 1971

(SEAL)
Attest:

Edward M. Fletcher, Jr.
Attesting Officer

WILLIAM E. SCHUYLER, JR
Commissioner of Patents